United States Patent [19]

Goicoechea

[11] 4,404,633

[45] Sep. 13, 1983

[54] PROCESS AND DEVICE FOR BRAKING AN AIRCRAFT BY SEEKING AN OPTIMAL SLIDING OF THE BRAKED WHEELS

[75] Inventor: Jose R. Goicoechea, Blagnac, France

[73] Assignee: Societe Nationale Industrielle Aerospatiale, Paris, France

[21] Appl. No.: 223,220

[22] Filed: Jan. 7, 1981

[30] Foreign Application Priority Data

Jan. 11, 1980 [FR] France ............................ 80 00558

[51] Int. Cl.³ .......................................... G06F 15/50
[52] U.S. Cl. ...................................... 364/426; 303/93
[58] Field of Search .................... 364/426; 303/93, 95, 303/110

[56] References Cited

U.S. PATENT DOCUMENTS

| | | | |
|---|---|---|---|
| 3,382,012 | 5/1968 | Lucien | 303/93 |
| 3,394,967 | 7/1968 | Lucien | 303/93 |
| 3,702,714 | 11/1972 | Branson | 303/93 |
| 4,180,223 | 12/1979 | Amberg | 303/93 |
| 4,367,529 | 1/1983 | Masclet et al. | 303/93 |

Primary Examiner—J. V. Truhe
Assistant Examiner—Saul M. Bergmann
Attorney, Agent, or Firm—Merriam, Marshall & Bicknell

[57] ABSTRACT

The present invention relates to a process and device for braking an aircraft taxiing on the ground after landing and comprising a plurality of braked wheels, by seeking a maximum coefficient of adherence between said braked wheels and the ground on which they roll, wherein said braking is subdivided into a plurality of successive braking periods and each of these periods is itself divided into a first phase during which a reference sliding value is imposed on each braked wheel and the optimal sliding value of the period is determined, and into a second phase during which said optimal sliding value is imposed on all said braked wheels. The invention is applicable to the automatic braking of aircraft.

11 Claims, 4 Drawing Figures

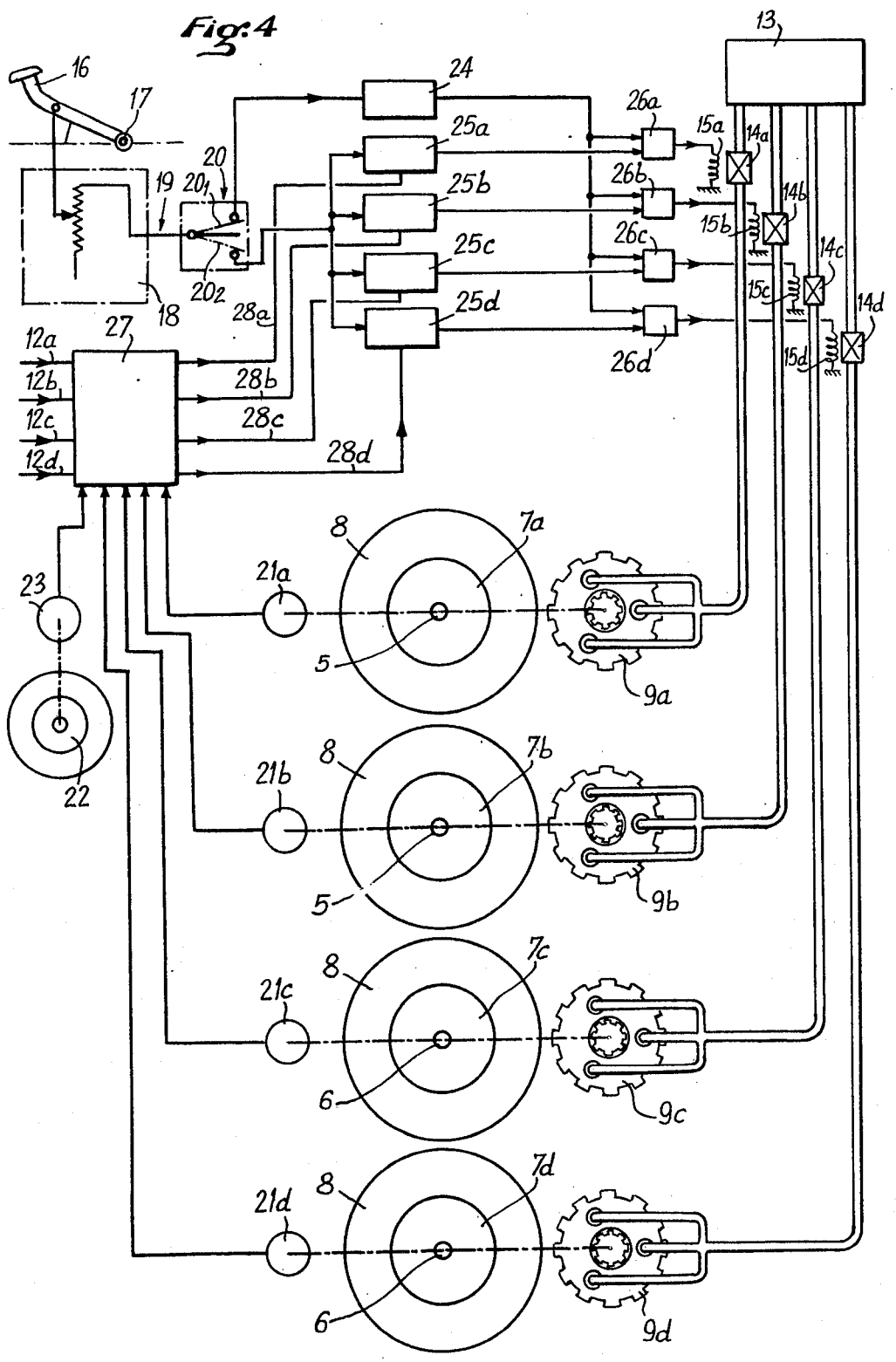

PROCESS AND DEVICE FOR BRAKING AN AIRCRAFT BY SEEKING AN OPTIMAL SLIDING OF THE BRAKED WHEELS

The present invention relates to a process for controlling braking of an aircraft taxiing on the ground, during its braking phase after landing.

It relates more particularly to braking control by seeking an optimal sliding between the braked wheels and the ground, procuring a maximum coefficient of adherence as a function of the conditions of said braking: state of the runway, load, speed, temperature and pressure of the tyres, etc . . . .

In order to understand the invention, it would be expedient to recall the different parameters involved in slowing down and stopping an aircraft taxiing on the ground by braking the wheels of its landing gear.

When an aircraft uses thrust recovery for flying, it can only make contact with the ground again tangentially after flight, so as to conserve a sufficient horizontal speed to ensure minimum lift of its wings. Contact with the ground is therefore made at a relatively high speed and, at that moment, the wheels of the landing gears are suddenly driven in rotation. The wheels of the main landing gear, placed beneath the wings, are the first to make contact with the ground, followed by the wheels of the nose gear.

Braking may then commence on the wheels of said main landing gear, the wheels of the nose gear never being braked. During the initial period of this braking, the aircraft is carried both by its wheels and by its wings, as its lift is, at that moment, not annulled. However, as the speed of the aircraft decreases, the residual lift decreases and consequently the load on the main landing gear increases.

The adherence of the wheels of the main landing gear therefore increases due to this increase in load and due to the decrease in speed. In fact, the tyres with which these wheels are equipped have an adherence which is an inverse function of the speed of taxiing.

To obtain stoppage of the aircraft after as short a braking distance as possible, it is therefore indispensable to adapt the brake torque to the adherence of the braked wheels, in the course of temporal development of said braking.

If a brake torque is applied to a wheel supporting a load P, it is balanced by the force of inertia of the mass corresponding to the load P, said mass given a certain speed, the bearing point being the ground, and more precisely the longitudinal reaction of the ground on the tyre, due to the adherence of the latter on the ground.

At the beginning of braking, the aircraft has a kinetic energy E, and during braking, this energy must be absorbed by the brakes of the wheels, which create a resistant force F whilst covering the stopping distance L. The work of the resistant force F on the path L is therefore equal to the kinetic energy, so that $$E = FL. \qquad (1)$$

This energy is converted into heat in the brakes. The energy E being determined by the speed of landing and the mass of the aircraft, the resistant force F must take a maximum value $F_m$ for the stopping distance L to be minimum.

However, the resistant force F is determined by the adherence of the tyres on the ground, and, for a determined ground, a determined tyre and a determined speed, F has a maximum value which cannot be exceeded without locking the braked wheel. The coefficient of adherence of the wheel under these conditions is defined by the equation:

$$\mu = F_m/P, \qquad (2)$$

$F_m$ being the maximum value of F and P the load on the wheel, mentioned hereinabove.

If the brake torque is sufficiently high to enable $F_m$ to be obtained, the minimum value of L is determined by the tyre ground adherence, since equation (3) may be deduced from equations (1) and (2):

$$L = E/P\mu \qquad (3)$$

If F takes a value slightly greater than $F_m$, the braked wheel is locked and, for a low speed, $\mu$ then takes the value of the coefficient of friction between the tyre and the ground.

Moreover, it is seen that, when the vertical load increases on the wheel, it is possible to increase $F_m$ for a constant $\mu$. This is the case whilst an aircraft is slowing down, since the lift of its wings is progressively destroyed.

Furthermore, it is important to note that the coefficient of adherence $\mu$ of a braked wheel is a function of the sliding between this wheel and the ground on which it is rolling. Sliding is understood to mean the quantity g defined by $$g = (w - w')/w \qquad (4)$$

in which expression w' represents the angular speed of the braked wheel and w the angular speed of a non-braked wheel of the aircraft (for example a wheel of the nose gear) and presenting the same diameter as said braked wheel.

This definition is equivalent to:

$$g = (V_a - V_f)/V_a \qquad (5)$$

in which $V_a$ is the horizontal longitudinal speed of the aircraft and $V_f$ the tangential speed of the braked wheel.

Due, inter alia, to the elasticity of the tyre, the coefficient of adherence $\mu$ takes a maximum value for a determined, so-called optimal sliding, greater than zero, the curve representing the variation of $\mu$ as a function of g comprising a branch of considerable inclination for value of g lower than said optimal value and a branch decreasing relatively smoothly for values of g greater than said optimal value. The optimal value of g is generally close to 0.15.

It is therefore advantageous to control the braking of an aircraft as a function of the sliding of the wheels.

U.S. Pat. Nos. 3,382,012 and 3,394,967 in particular already describe processes of braking of this type. These processes concern a process of continuously seeking maximum adherence during a braking phase, and the devices which carry them out require specific elements such as special servo-valves of which assembly must preferably be provided when an aircraft is designed. These devices are therefore difficult to adapt to aircraft which are not provided to receive them.

The process according to the invention remedies these drawbacks and proposes a process for sequentially measuring the coefficient of tyre-runway adherence and for the likewise sequential application of a brake torque leading to the substantially optimal sliding for the sequence in question.

To this end, according to the invention, the process for braking an aircraft taxiing on the ground after landing and comprising a plurality of braked wheels, by seeking a maximum coefficient of adherence between said braked wheels and the ground on which they roll, is noteworthy in that said braking is sub-divided into a plurality of successive braking periods, and each of said braking periods is itself divided into a first phase or interval during which, on the one hand, a reference sliding value is imposed on each braked wheel, which is particular thereto and which is different from the reference sliding values imposed on the other braked wheels and, on the other hand, the optimal sliding value of the period is determined from a calculation of quantities representative of the coefficients of adherence corresponding to said different reference sliding values, and into a second phase or interval during which said optimal sliding value is imposed on all of said braked wheels.

Thus, this optimal sliding value is calculated from measurements obtained by diversification of reference sliding of a plurality of wheels, belonging for example to the same landing gear, this diversification being effected for a very short time with respect to the braking period, as the first phase of a braking period is very short with respect to the second phase of the same braking period. For example, the duration of the first phase of a braking period may be chosen to be equal to 0.5 s, whilst the second phase of said period is a few tens of seconds. During the first phase of a braking period, as many pairs of values for $\mu$ and g are obtained as there are braked wheels, so that, from this plurality of pairs of values, it is possible, for example by means of an electronic calculator, to reconstitute the curve $\mu=f(g)$ of the period and therefore to determine the maximum value of $\mu$ and the corresponding optimal value of g.

The curve K representing the function $\mu=f(g)$, as shown in FIG. 1, varies as a function of parameters such as the state of the tires and the state of the runway. However, the shape of the curve K remains essentially constant and can be represented, at least in the region of its maximum value $\mu_m$, by an approximate mathematical formula of appropriate type, e.g., a cubic equation of the form $$\mu = Sg^3 + Tg^2 + Ug + V$$

where S, T, U, and V are constants. It will be seen that if the constants S, T, U and V can be evaluated, an equation representing the coefficient of adherence $\mu$ as a function of the sliding value g can be obtained, from which the optimal value of g resulting in the maximum value of $\mu$ can be determined by conventional means, e.g., by setting the first derivative of the function equal to zero and solving the resulting equation for g.

Curve K (FIG. 1) representing the coefficient of adherence $\mu$ can be represented by expressions other than a cubic equation, as will be appreciated by those skilled in the art. The object is to develop a mathematical equation for curve K from a known plurality of points ($\mu$, g) which fall on the curve. Methods for developing an equation representing the curve from such data are well known and do not per se form any part of the present invention.

In each of said pairs of values ($\mu$, g), g is known since it is imposed on the braked wheels. It is therefore necessary to know the values of $\mu$ corresponding to each value of g.

From equation (2) above, it will be seen that $\mu$ is substantially proportional to resistant or drag force F. Further, drag force F is proportional to the drag torque C resulting from a brake torque $C_F$ applied to the wheel, since $$C = F \times R$$

where R is the radius of the wheel. Accordingly, the value of C (drag torque) bears a proportional relationship to the coefficient of adherence $\mu$ which exists at any sliding value imposed on the wheel, i.e., $\mu=kC$, where k is a proportionality constant.

To obtain the maxium value of $\mu$, the maximum value of the drag torque C must therefore be sought. Said drag torque is given by the equation:

$$C = C_F + I(dwf/dt) \tag{6}$$

where $C_F$ is the brake torque applied on a wheel, I the moment of inertia of this wheel and dwf/dt the angular deceleration due to braking.

In fact, when the landing gear touches the ground, the wheels are set into rotation, and as their mass is considerable, this should be taken into account and the inertia torque of the braked wheels should be subtracted from the brake torque of the braked wheels should be subtracted from the brake torque in order to obtain the drag torque. This is so since dwf/dt has a negative value.

In equation (6):

the moment of inertia I of a wheel depends only on said wheel and is therefore known, dwf/dt may be obtained by derivation of the angular speed wf whose image may be an electric current furnished by a tachometer generator driven by each wheel, the brake torque $C_F$ must be measured.

On a landing gear where each brake has its own reaction bar, the brake torque $C_F$ may be measured with the aid of strain gauges placed on each bar. When one reaction bar only is used for the two brakes of a pair of wheels, this is no longer possible.

In the latter case, if the braking equipment comprises a hydraulic reservoir, an electrohydraulic servo-valve and brakes with hydraulic receivers, it is possible to determine the brake torque $C_F$ from the servo-valve electric current. This is then corrected as a function of the gain of the servo-valve (in bars per milliampere) and of the brake gain (in mdaN per bar, where "mdaN" represents meterdecaNewton or meter$\times$10 Newton).

A current representing the brake torque $C_F$ is then obtained, by adopting respective determined values for said servo-valve and brake gains.

The different values of drag torque C as a function of the different slidings being calculated, there remains only to determine the optimal value of the sliding. This may be done by reconstitution of the curve $\mu=kC=f(g)$, from the pairs of values representing C and the corresponding value of g, and determining from the curve the value of g which gives a maximum value of C and hence of $\mu$, since $\mu$ is proportional to C, as previously explained.

As these different values of C are successively calculated for different speeds, the load of each wheel (which varies with the speed, as mentioned hereinabove), is substantially taken into account so that the values of the drag torque thus calculated are substantially proportional to the coefficient of adherence $\mu$.

An image of $\mu$ might also be obtained by measuring the effective load on the legs of the landing gear with the aid of a dynamometer or a strain gauge assembly and making the ratio C/P or F/P.

To obtain optimal g, it is also possible to effect a selective weighting of the samples of sliding obtained by diversification of the sliding during said phases of measurements. For example, it is possible not to take into account the slidings causing a reduction of adherence, and to calculate an intermediate sliding between the slidings having provoked an increase in adherence.

Furthermore, to impose a reference slide value on a braked wheel, a brake torque may be applied, i.e. in fact a hydraulic pressure in the brakes associated with the wheels, and this pressure may be slightly decreased as soon as the measured sliding reaches or slightly exceeds the desired reference value.

In an advantageous embodiment of the process according to the invention, the different reference sliding values applied to the different braked wheels during the first phase of each period of braking are deduced from the optimal slide value of the preceding period, one being able to be equal to this optimal value whilst the others differ more or less by a few hundredths.

The initial period of braking may be such that a constant sliding is imposed on the different braked wheels, identical for all of them, the common value of this initial sliding being predetermined, for example experimentally, as a function of the characteristics of the aircraft and the typical conditions of the runway.

The beginning and end of each braking period may be determined from different parameters such as braked taxiing distance covered or to be covered, or time lapsed since landing. However, it is advantageous if the beginning and end of a braking period are determined by the speed of taxiing of the aircraft. For example, the initial braking phase with a common sliding value for all the wheels may begin as soon as the nose gear has made contact with the ground (following impact of the main landing gear), the second phase being triggered for a taxiing speed of 50 m/s, the third for a taxiing speed of 35 m/s and a fourth for a taxiing speed of 20 m/s.

The invention will be more readily understood on reading the following description with reference to the accompanying drawings, in which.

FIG. 4 schematically shows a braking device for carrying out the process according to the invention.

Figure 1:
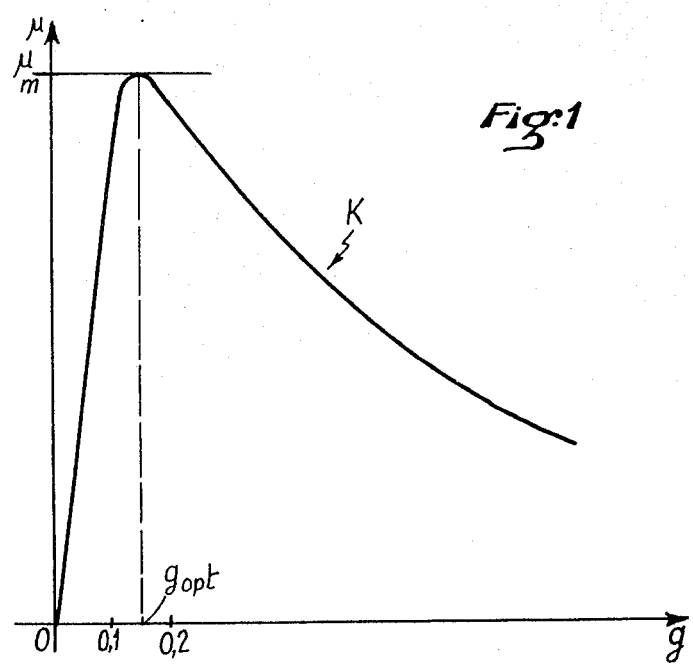
FIG. 1 illustrates the variation of the coefficient of adherence $\mu$ of a wheel as a function of the sliding g of said wheel with respect to the ground.

Referring now to the drawings, FIG. 1 shows the general trend of the curve K representative of the function $\mu = f(g)$, giving the ground adherence $\mu$ of a braked wheel as a function of the sliding g of this braked wheel with respect to the ground. The general trend of this curve comprises a rapidly increasing portion for values of g included between 0 and 0.10 and a decreasing portion beyond g=0.20, the adherence $\mu$ passing through a maximum value $\mu_m$ for an optimal value $g_{opt}$ of g, close to 0.15. Of course, the curve K varies as a function of different parameters such as state of the tyre with which the wheel is equipped, state of the runway, etc.; however, this curve K always presents the general trend of FIG. 1. It is therefore advantageous to control the braking of an aircraft as a function of the sliding of the braked wheels, so as to impose on said wheels the optimal sliding $g_{opt}$ in order that the adherence $\mu$ presents its maximum value $\mu_m$.

Figure 2:
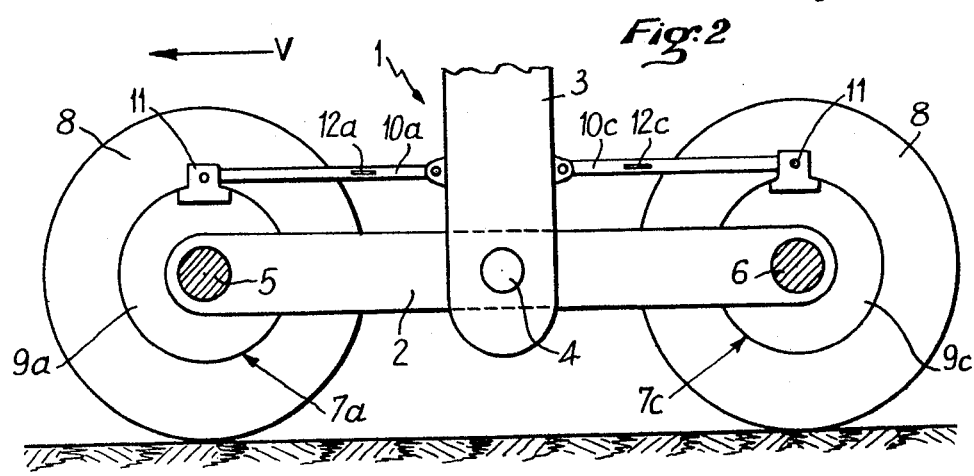
FIG. 2 shows, in a vertical section along line II—II of FIG. 3, the landing gear bogie of an aircraft, equipped to carry out the process according to the invention.
Figure 3:
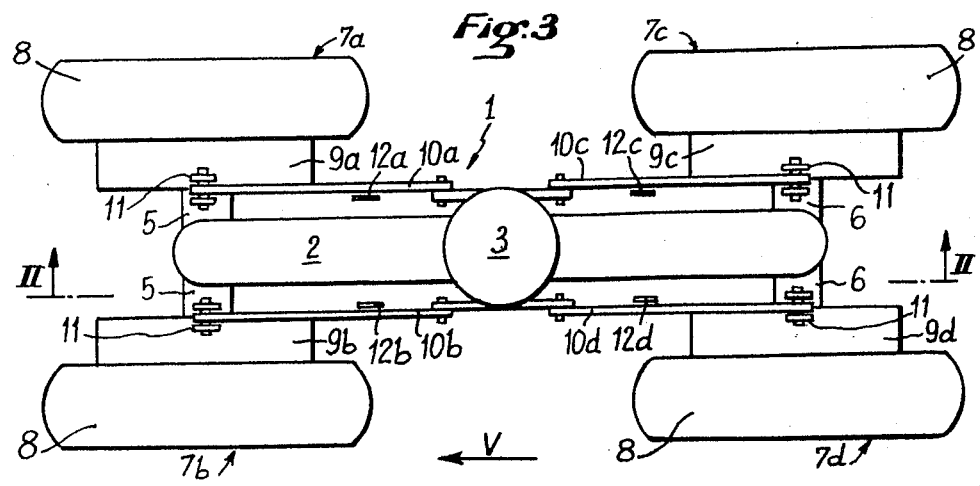
FIG. 3 shows, in plan view, the bogie of FIG. 2.

The process according to the invention will be explained hereinafter in its application to the bogie wheels 1 of FIGS. 2 and 3.

The bogie 1 of the landing gear of a jumbo-jet or wide-body aircraft, shown in these Figures, comprises a longitudinal member 2 pivoted at its centre on the lower part of a leg 3, via a horizontal pivot pin 4. The top of the leg is fast with the fuselage (not shown) of the aircraft.

At its two ends, the longitudinal element 3 is provided with transverse shafts 5 or 6, on each of which two identical twinned wheels 7a, 7b or 7c, 7d provided with tyres 8 are mounted to rotate. A disc brake 9a to 9d is associated with each wheel 7a to 7d, of which the torque plate is prevented from rotating by a brake bar 10a to 10d. To this end, each brake bar 10a to 10d is articulated at one of its end on the leg 3 and, at its other end, on a fork joint 11 fast with the corresponding torque plate.

Assuming that the bogie 1 moves in the direction of arrow V (FIGS. 2 and 3), it will be noted that a braking action of the brakes 9a to 9d is translated by a compression of the brake bars 10c and 10d disposed between the leg 3 and the rear wheels 7c and 7d and by a traction of the brake bars 10a and 10b disposed between the leg 3 and the front wheels 7a and 7b. Strain gauges 12a to 12d may therefore be placed on these brake bars 10a to 10d to measure the brake torque exerted by the brakes 9a to 9d on the wheels 7a to 7d.

As shown in FIG. 4, which schematically shows a braking device for carrying out the process according to the invention, the brakes 9a to 9d are supplied from a source of hydraulic fluid 13 via respective servo-valves 14a to 14d.

These servo-valves 14a to 14d are normally maintained closed by the current passing through their respective control winding 15a to 15d which receives the synthesis of the different electric signals of the assembly.

A brake pedal 16, pivoting about axis 17, controls a pedal transmitter 18, essentially constituted by a potentiometer supplied by an on-board voltage.

The output 19 of the transmitter 18 is connected to a two-way switch 20 controlled by the pilot of the aircraft: if the switch is in position $20_1$, braking of the aircraft is "manual", i.e. due to the action of the pilot on the pedal 16, whilst, if the switch is in position $20_2$, braking of the aircraft is "automatic", i.e. slide-controlled.

A tachometer generator 21a to 21d is respectively mounted on each of the braked wheels 7a to 7d. Similarly, a tachometer generator 23 is mounted on at least one non-braked wheel 22 of the aircraft (wheel of the nose gear).

Downstream of the switch 20, the braking device comprises two branches in parallel, each connected to the position $20_1$ or $20_2$, one comprising a directly actuated device 24, the other comprising four slide-controlled devices 25a to 25d themselves in parallel with respect to one another. These branches lead to matching circuits 26a to 26d each associated with a respective control winding 15a to 15d and serving as current generator therefor. Each of the matching circuits 26a to 26d comprises two inputs, of which one is connected to the output of the directly actuated device 24 and the other to the output of the associated slide-controlled device 25a to 25d.

Furthermore, the braking device comprises a calculator 27, receiving the signals from the four strain gauges 12a to 12d and that of the tachometer generators 21a,21b,21c and 23. This calculator 27 controls the four servo-control devices 25a to 25d by corresponding lines 28a to 28d.

When an aircraft makes contact with the ground, the pilot has the choice of how to brake until the aircraft stops: if he places the switch 20 into position $20_1$, he will control braking in conventional manner by controlling the brake 16, via devices 18, 24,26a to 26d, 15a to 15d, 14a to 14d, and 7a to 7d. On the other hand, if he places switch 20 in position $20_2$, braking will be automatic and controlled by the calculator 27 and the servo-control devices 25a to 25d, independently of his depressing the pedal 16.

If automatic braking according to the invention is chosen (the switch 20 is therefore in position $20_2$), as soon as the nose gear of the aircraft has made contact with the ground (which occurs after the main landing gear has made contact), the calculator 27 controls the servo-control devices 25a to 25d so that they impose on the corresponding wheels 7a to 7d the same reference sliding value, predetermined experimentally for the aircraft in question. This initial reference sliding value, common to the four wheels 7a to 7d is for example equal to 0.15. To this end, the servo-control devices 25a to 25d control the matching circuits 26a to 26d so that the pressure of the braking fluid in the brakes 9a to 9d controlled by the servovalves 14a, 15a–14b,15b–14c,15c and 14d,15d corresponds to the sliding value in question, i.e. 0.15 in the example. The calculator 27 calculates, from the indications of the tachometer generators 21a, 21b, 21c,21d and 23, the sliding values actually taken by each of the wheels 7a to 7d and, via the links 25a,26a,1-5a-25b,26b,15b-25c,26c,15c and 25d,26d,15d, acts on the servovalves 14a to 14d to maintain the sliding of the four wheels 7a to 7d at the common value chosen.

Due to this first period of braking of the wheels 7a to 7d controlled by a common sliding, the speed of the aircraft decreases When this speed reaches, on decreasing, a first determined value, for example 50 m/s, the tachometer generator 23 sends an order to the calculator 27 which will then control a second braking period controlled by sliding, different from the first.

In a second servo-control period, the calculator 27 firstly orders, in a first phase, via respective links 26a,1-5a,14a-26b,15b,14b-26c,15c,14c and 26d,15d,14d the servo-control devices 25a to 25d to impose on the four wheels 7a to 7d four different, predetermined reference sliding values; for example, a sliding equal to 0.09 is imposed on braked wheel 7a and a sliding equal to 0.11 on braked wheel 7b, whilst the slidings imposed on braked wheels 7c and 7d have respective values 0.13 and 0.15, these reference values being maintained constant, as previously, due to the direct calculation of the actual slidings from the indications of the tachometer generators 21a to 21d and 23.

During this first phase of the second automatic braking period, the calculator 27 which receives the signals from the strain gauges 12a to 12d, calculates the brake torque on each of said wheels. From this brake torque, the moment of inertia of the wheels (stored in memory) and the angular deceleration thereof (calculated from the signal from the tachometer generators 21a to 21d), the calculator 27 calculates, in the manner indicated hereinabove, the drag torque of each wheel 7a to 7d, which, as has been seen, is substantially proportional to the coefficient of adherence.

Four values of drag torque are therefore obtained, each associated with a sliding value. From these four pairs of values C, g, the calculator 27 may, from a predetermined law, stored in memory and representing the general trend of the curve K, e.g., a cubic function, develop an equation representing the drag torque (or the coefficient of adherence proportional thereto), and from said equation determine a first optimal value $g_{opt.1}$ for sliding g, during the second controlled braking period.

The first phase of the second braking period is therefore also a measuring phase.

Following this measuring phase, the second phase of the second braking period is carried out, during which the calculator 27 orders the servo-control devices 25a to 25d to apply to the four wheels 7a to 7d the same constant sliding having the value $g_{opt.1}$.

This second phase of the second braking period ends when the speed of the aircraft reaches a second determined value, for example equal to 35 m/s. The tachometer generator 23 then controls the calculator 27 which itself will control a third braking period.

During a first phase of this third period, the calculator 27 orders the servo-control devices 25a to 25d, in the same way as has been described hereinabove, to impose on the four wheels 7a to 7d four different predetermined reference sliding values, these four values being chosen to be equal to $g_{opt1}\pm\epsilon$. For example, a sliding equal to $g_{opt1}$ is imposed on wheel 7a and a sliding equal to $g_{opt1}-0.01$ on wheel 7b, whilst the sliding imposed on wheels 7c and 7d have respective values $g_{opt1}-0.02$ and $g_{opt1}=0.02$.

In the same way as has been described hereinabove, the calculator 27 deduces a second optimal value $g_{opt2}$ therefrom, which it imposes on the four wheels 7a to 7d during the second phase of the third braking period.

When the speed of the aircraft reaches a third determined value, for example equal to 20 m/s, the generator 23 warns the calculator 27 which will control a fourth braking period.

During a first phase of this fourth period, the calculator 27 imposes on the four wheels 7a to 7d four reference sliding values equal to $g_{opt2}\pm\epsilon$. For example, it imposes on wheel 7a a sliding equal to $g_{opt2}$ and on wheel 7b a sliding equal to $g_{opt2}-0.01$, whilst the slidings imposed on wheels 7c and 7d have the respective values $g_{opt2}-0.02$ and $g_{opt2}+0.02$.

The calculator 27 then deduces a third optimal value $g_{opt3}$ therefrom, which it imposes on the four wheels 7a to 7d during the second phase of the fourth braking period. This fourth braking period may continue until the aircraft comes to a standstill. It may also be stopped when the generator 23 indicates a fourth predetermined value of speed, for example 10 m/s. In this case, the pilot takes back control of braking until standstill, after flipping the switch 20 from its position $20_2$ to its position $20_1$.

Thus, according to the invention, the calculations and measurements made for a plurality of values of slidings enable an optimal sliding to be calculated which is valid for each period of taxiing, i.e. for a range of reduced speeds.

This process of measuring and control presents a considerable advantage over the continuous measuring and control processes: it enables measurements to be made for sliding values exceeding the optimal value without provoking locking of the braked wheels, due to the short duration of the measurements.

Consequently a really optimal value of the sliding may be calculated. For each braking period, the load of each wheel is indirectly brought into play.

In the known systems, either the optimum sliding is not attained, or it is attained by periods but exceeded at others, this causing locking of the wheels.

What is claimed is:

1. Process for braking an aircraft taxiing on the ground after landing, said aircraft comprising a plurality of braked wheels, comprising the steps of:
    dividing said braking into a plurality of successive braking periods;
    sub-dividing each of said braking periods into a first relatively short interval and a second substantially longer interval;
    imposing on each of said wheels a predetermined different reference sliding value during said first interval;
    determining for each wheel a coefficient of adherence corresponding to the sliding value imposed thereon;
    establishing from said imposed sliding values and corresponding coefficients of adherence a relationship expressing the coefficient of adherence of said wheels as a function of the sliding value imposed thereon;
    determining from said relationship an optimal sliding value resulting in the maximum value of the coefficient of adherence; and
    imposing said optimal sliding value on all of said wheels during said second interval.

2. The process of claim 1, wherein, in a braking period, the first interval lasts a few tenths of second, whilst the second interval lasts a few tens of seconds.

3. The process of claim 1, wherein the coefficients of adherence of the braked wheels are represented by the drag force or the drag torque thereof.

4. The process of claim 1 applied to wheels provided with hydraulic brakes wherein the sliding of the braked wheels is controlled by controlling the pressure of the fluid in the associated brakes.

5. The process of claim 1, wherein the different reference sliding values applied to the different braked wheels during the first interval of each braking period are deduced from the optimal sliding value of the preceding braking period, one being equal to this optimal value whilst the others differ therefrom by a few tenths.

6. The process of claim 1, wherein the beginning and end of a braking period are determined by predetermined values of the taxiing speed of the aircraft.

7. The process of claim 3, wherein the drag force or the drag torque are measured by means of strain gauges.

8. The process of claim 1, applied to all the braked wheels of all the bogies of a landing gear.

9. A process in accordance with claim 1 further including a preliminary phase prior to the first of said successive braking periods, during which preliminary phase a constant predetermined sliding value is imposed on all of said braked wheels.

10. A device for braking an aircraft comprising a plurality of braked wheels and at least one non-braked wheel, said device comprising:
    means including braking means for imposing on each of said braked wheels a different predetermined sliding value,
    means including a tachometer generator associated with each of said braked wheels and said non-braked wheel for determining a coefficient of adherence of each braked wheel corresponding to the sliding value imposed thereon;
    means for establishing from said sliding values and corresponding coefficients of adherence a relationship expressing the coefficient of adherence of said braked wheels as a function of the sliding value imposed thereon;
    means for determining from said relationship an optimal sliding value resulting in the maximum value of the coefficient of adherence; and
    means for imposing said optimal sliding value on all of said braked wheels.

11. A device in accordance with claim 10 wherein each of said braking means comprises:
    a hydraulic brake, and
    a servovalve associated with each brake and controlling the operation thereof.

* * * * *